(12) United States Patent
Karino et al.

(10) Patent No.: US 7,075,032 B2
(45) Date of Patent: Jul. 11, 2006

(54) POWER SUPPLY APPARATUS

(75) Inventors: Kunio Karino, Osaka (JP); Toshikazu Fujiyoshi, Osaka (JP); Kenzo Danjo, Osaka (JP); Hideo Ishii, Osaka (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 452 days.

(21) Appl. No.: 10/718,905

(22) Filed: Nov. 21, 2003

(65) Prior Publication Data
US 2005/0109749 A1 May 26, 2005

(51) Int. Cl.
*B23K 9/10* (2006.01)
(52) U.S. Cl. .................................. 219/130.51; 363/34
(58) Field of Classification Search .......... 219/130.51, 219/130.4, 137 PS; 363/34, 37
See application file for complete search history.

(56) References Cited

U.S. PATENT DOCUMENTS

| | | | |
|---|---|---|---|
| 5,264,679 A * | 11/1993 | Martin | 219/130.51 |
| 5,343,017 A * | 8/1994 | Karino et al. | 219/130.51 |
| 6,111,216 A * | 8/2000 | Stava | 219/130.51 |

* cited by examiner

Primary Examiner—Clifford C. Shaw
(74) Attorney, Agent, or Firm—Duane Morris LLP

(57) ABSTRACT

An input-side rectifier (4), a smoothing capacitor (6), an inverter (8), a transformer (10) and an output-side rectifier (12) operate together to convert an AC voltage supplied from an AC power supply to a DC voltage. The DC voltage is coupled through a DC-to-AC converter (16) to a workpiece (18) and a torch (20). An auxiliary voltage supply (28) supplies the workpiece (18) and the torch (20) with a negative voltage for a short time following the transition of the AC voltage supplied to the workpiece (18) and the torch (20) from positive to negative. The negative voltage has a negative peak value larger than the negative peak value of the AC voltage supplied to the workpiece (18) and the torch (20), and rapidly changes from the negative peak value. The auxiliary voltage supply (28) produces a DC voltage having a negative peak value larger than the negative peak value of the AC voltage supplied to the workpiece (18) and the torch (20), by means of a transformer (30), a rectifier (32) and a smoothing capacitor (36). The smoothing capacitor (36) is coupled to the workpiece (18) and the torch (20) through a transistor (38) and a current-limiting resistor (40). A differentiating circuit (46) is coupled in parallel with the current-limiting resistor (40), and includes a resistor (48) having a smaller resistance value than the current-limiting resistor (40).

9 Claims, 14 Drawing Sheets

US 7,075,032 B2

1

POWER SUPPLY APPARATUS

This invention relates to a power supply apparatus for, for example, an AC arc welder and, more particularly, to such power supply apparatus using an AC voltage resulting from conversion of a DC voltage.

BACKGROUND OF THE INVENTION

An example of a prior art power supply apparatus for use with an AC arc welder is shown in FIG. 1. The power supply apparatus of FIG. 1 has power supply input terminals 2a, 2b and 2c, to which an AC supply, e.g. a three-phase commercial AC supply (not shown) is connected. The power supply input terminals 2a–2c are connected to an input-side rectifying circuit 4. The input-side rectifying circuit 4 rectifies a first AC voltage, e.g. a three-phase commercial AC voltage from the three-phase commercial AC supply and develops a rectified voltage. The rectified voltage is smoothed and changed to a DC voltage by a smoothing capacitor 6. The resultant DC voltage is applied to DC-to-high-frequency converter means, e.g. a high-frequency inverter 8 and converted into a high-frequency voltage. The high-frequency inverter 8 has a plurality of semiconductor switching devices, e.g. IGBTs, bipolar transistors or FETs although not shown. An inverter control circuit 9 controls the conduction period of the semiconductor switching devices. The high-frequency voltage from the inverter 8 is applied to a primary winding 10P of a transformer 10 having a secondary winding 10S in which a boosted high-frequency voltage is induced. The boosted high-frequency voltage is rectified by diodes 12a, 12b, 12c and 12d of an output-side rectifying circuit 12. The rectified voltage is developed between a positive output terminal 12P and a negative output terminal 12N. The rectified voltage is smoothed by smoothing reactors 14a and 14b, to develop a main DC voltage. Thus, the input-side rectifying circuit 4, the smoothing capacitor 6, the inverter 8, the transformer 10, the output-side rectifying circuit 12, and the smoothing reactors 14a and 14b form a DC power supply.

The main DC voltage from the DC power supply is applied to a DC-to-AC converter 16, which produces from the main DC voltage, a second AC voltage. The second AC voltage is applied across a load, or between, for example, a workpiece 18 and a torch 20 via output terminals 17A and 17B of the power supply apparatus. The DC-to-AC converter 16 includes a semiconductor switching device, e.g. an IGBT 22a, connected to the positive output terminal 12P of the output-side rectifying circuit 12 through the smoothing reactor 14a. Specifically, the collector of the IGBT 22a is connected through the smoothing reactor 14a to the positive output terminal 12P, and the emitter of the IGBT 22a is connected to the workpiece 18. Similarly, the DC-to-AC converter 16 has a semiconductor switching device, e.g. an IGBT 22b, connected through the smoothing reactor 14b to the negative output terminal 12N of the output-side rectifying circuit 12. Specifically, the emitter of the IGBT 22b is connected through the smoothing reactor 14b to the negative output terminal 12N, and the collector of the IGBT 22b is connected to the workpiece 18. The transformer 10 has an intermediate tap 10T on the secondary winding 10S. The intermediate tap 10T is connected to the torch 20. Antiparallel diodes 24a and 24b are connected across the respective emitter-collector conduction paths of the IGBTs 22a and 22b.

A control signal at a predetermined frequency (e.g. at several tens of hertz (Hz) to several hundred hertz (Hz)) is

2 supplied to the gate of each of the IGBTs 22a and 22b from a DC-to-AC conversion control circuit 26, and the IGBTs 22a and 22b are alternately rendered conductive. When, for example, the IGBT 22a is conductive, a current of the positive polarity flows from the positive output terminal 12P through the smoothing reactor 14a, the IGBT 22a, the workpiece 18 and the torch 20 to the intermediate tap 10T, during a period Tpe shown in FIG. 2A. Conversely, when the IGBT 22b is conductive, a current of the negative polarity flows from the intermediate tap 10T through the torch 20, the workpiece 18, the IGBT 22b and the smoothing reactor 14b to the negative output terminal 12N during a period Tne. In this manner, an AC arc is generated between the workpiece 18 and the torch 20 for welding.

In this case, if the welding current is smaller than, for example, 50 A, the energy stored in the smoothing reactors 14a and 14b is insufficient even when the welding current has a rectangular waveform as shown in FIG. 2A, and, therefore, an arc, sometimes, cannot be re-generated between the torch 20 and the workpiece 18 at the transition of the welding current from the positive polarity to the negative polarity. In this specification, terms "re-generate", "re-generation" and "re-generated" used in association with an arc or arcing are meant to express re-generation of an arc, which is once extinguished at the transition of a welding current from positive to negative, after the welding current changes to negative.

In order to help the re-generation of arcing, another voltage supply 28 providing an arc re-generating voltage to be superposed is used. The superposition voltage supply 28 includes a voltage-boosting transformer 30 having its primary winding 30P is connected between the power supply input terminals 2a and 2b for receiving therefrom an AC voltage, so that a boosted AC voltage is induced in a secondary winding 30S of the transformer 30. The boosted AC voltage is rectified by a rectifier 32 and smoothed by a combination of a resistor 34 and a capacitor 36 to form a DC voltage. The transformer 30, the rectifier 32, the resistor 34 and the capacitor 36 form an auxiliary voltage supply 28.

The peak value of the DC voltage from the combination of the resistor 34 and the capacitor 36 is larger than the negative peak value of the voltage applied between the workpiece 18 and the torch 20 during the negative polarity period of the AC welding voltage. The DC voltage is applied between the torch 20 and the workpiece 18 through a series combination of a semiconductor switching device, e.g. a bipolar transistor 18, and a current limiting resistor 40, and the IGBT 22b, in such a manner that the workpiece 18 is negative and the torch 20 is positive. More specifically, the DC voltage is applied when the IGBT 22b is conductive, so that the workpiece 18 is negative and the torch 20 is positive. The application of the DC voltage is carried out by rendering the bipolar transistor 38 conductive. The conducting period of the bipolar transistor 38 is controlled by a control signal applied to the base of the bipolar transistor 38 from a superposition voltage control circuit 42, which starts providing the control signal to the bipolar transistor 38 in synchronization with the generation, by the DC-to-AC conversion control circuit 26, of the control signal to render the IGBT 22b. The control signal is applied to the bipolar transistor 38 for a period shorter than the period during which the welding voltage is negative. A diode 44 is connected in parallel with the series combination of the current limiting resistor 40 and the bipolar transistor 38. The diode 44 becomes conductive when the input voltage to the DC-to-AC converter 16, i.e. the voltage between the intermediate tap 10T and the negative output terminal 12N, transiently increases, to thereby cause the capacitor 36 to absorb the transient voltage.

When the polarity changes from positive to negative, the transistor 38 is rendered conductive, and a DC voltage as shown in FIG. 2B is supplied from the auxiliary voltage supply 28, which facilitates the re-generation of an arc. In this case, since the capacitor 36 and the resistor 40 form an integration circuit, the DC voltage discharged from the capacitor 36 rises gently.

The above-described power supply apparatus requires a voltage higher than, for example, 200 V to be applied between the output terminals 17A and 17B in a state in which the workpiece 18 and the torch 20 are not connected to the output terminals 17A and 17B, in order for an arc to be re-generated between the workpiece 18 and the torch 20, or requires a voltage even higher than 250 V for stable arc re-generation. Accordingly, if the voltage supplied at the input terminals 2a–2c becomes low due to voltage variations, a voltage sufficient for stable arc re-generation sometimes cannot be applied between the workpiece 18 and the torch 20.

An object of the present invention is to provide a power supply apparatus which can reliably re-generate an arc even when a small welding current changes from positive to negative.

SUMMARY OF THE INVENTION

A power supply apparatus according to the present invention includes a DC power supply, which provides a voltage obtained by, for example, rectifying and smoothing a first AC voltage from a commercial AC power supply. A DC-to-AC converter converts a DC voltage from the DC power supply into a second AC voltage alternating between positive and negative polarities for application to a load via output terminals of the power supply apparatus. A superposition voltage supply prepares a negative superposition voltage from the AC power supply or from the DC power supply for application to the load. The superposition voltage rapidly changes from a peak value larger than a negative peak value of the second AC voltage, over a period which starts when the second AC voltage changes from the positive polarity to the negative polarity and is shorter than the period in which the second AC voltage exhibits the negative polarity. The superposition voltage supply includes an auxiliary voltage supply providing a DC voltage having a peak value larger than the negative peak value of the second AC voltage, switching means which is rendered conductive for a period shorter than the period during which the second AC voltage is negative, and a current-limiting resistor connected in series with the switching means. The superposition voltage supply causes a current to flow from the auxiliary voltage supply through the switching means, the current-limiting resistor and the output terminals of the power supply apparatus when the switching means is conductive. A differentiating circuit is connected in parallel with the current-limiting resistor. The differentiating circuit includes a resistor having a smaller resistance value than the current-limiting resistor.

With the above-described arrangement of a power supply apparatus, when the second AC voltage applied to the welding load changes from positive to negative, a negative voltage rapidly changing from a peak value larger than the negative peak value of the second AC voltage is applied to the welding load from the superposition voltage source to secure the re-generation of an arc at the time of transition of the second AC voltage from the positive polarity to the negative polarity. When the switching means becomes conductive, current flows through the differentiating circuit, which includes the resistor having a smaller resistance value than the current-limiting resistor, whereby a large voltage is applied to the welding load. If the differentiating circuit were not used, the current would flow through the current-limiting resistor, and, therefore, a large voltage could not be applied to the welding load. The use of the differentiating circuit makes it possible for a larger voltage to be applied to the welding load than when only the current-limiting resistor is used even when the voltage from the auxiliary voltage supply decreases due to variations of the voltage from the DC power supply or the AC power supply. Thus, the re-generation of an arc is secured.

The differentiating circuit preferably includes a series combination of a capacitor and the resistor. The capacitor has such a capacitance value as to be charged completely in a time period shorter than the period during which the switching means is conductive. The capacitor is charged while the switching means is conductive, but when the charging is completed, a voltage is applied to the welding load through the current-limiting resistor.

The auxiliary voltage supply may include a smoothing capacitor in its output. With the auxiliary voltage supply with the smoothing capacitor and without the differentiating circuit, the smoothing capacitor and the current-limiting resistor would form an integrating circuit and, therefore, the voltage applied to the welding load would increase gently. On the other hand, according to the present invention, the above-described differentiating circuit is used, through which charge on the smoothing capacitor is supplied to the welding load through the differentiating circuit. Accordingly, the voltage applied to the welding load can rise up rapidly.

The DC power supply may be an AC-to-DC converter which receives a first AC voltage and converts the first AC voltage into a DC voltage. When the AC-to-DC converter is used, the auxiliary voltage supply operates to convert the first AC voltage to a DC voltage having a peak value larger than the negative peak value of the second AC voltage. Alternatively, the auxiliary voltage supply may be a voltage booster which operates to voltage-boost a DC voltage supplied by the DC power supply.

The auxiliary voltage supply may include an auxiliary voltage supply input-side rectifying and smoothing circuit for rectifying and smoothing the first AC voltage to produce a DC voltage. The resulting DC voltage is converted to a high-frequency voltage by an auxiliary voltage supply high-frequency inverter. The resulting high-frequency voltage is boosted by an auxiliary voltage supply high-frequency transformer, and the boosted high-frequency voltage is rectified and smoothed by an auxiliary voltage supply output-side rectifying and smoothing circuit. With this arrangement, since the auxiliary voltage supply employs an efficient, small and light high-frequency transformer for voltage-boosting, the power supply apparatus as a whole can be small and light.

The DC power supply may include an input-side rectifying and smoothing circuit which rectifies and smoothes the first AC voltage to form a DC voltage. The resulting DC voltage is converted to a high-frequency voltage by a high-frequency inverter. The resulting high-frequency voltage is boosted by a high-frequency transformer, and the boosted high-frequency voltage is rectified and smoothed by an output-side rectifying and smoothing circuit. The auxiliary voltage supply may include a auxiliary voltage supply high-frequency inverter coupled to the input-side rectifying and smoothing circuit for converting the DC voltage from the input-side rectifying and smoothing circuit to a high-frequency voltage for the auxiliary voltage supply. The high-frequency voltage is then boosted by an auxiliary voltage supply high-frequency transformer, and the boosted high-frequency voltage is rectified and smoothed by an auxiliary voltage supply output-side rectifying and smoothing circuit.

The auxiliary voltage supply may include an auxiliary voltage supply high-frequency transformer which is coupled to the DC power supply high-frequency inverter and boosts the high-frequency voltage from the high-frequency inverter. The boosted high-frequency voltage is rectified and smoothed by an auxiliary voltage supply output-side rectifying and smoothing circuit.

The DC power supply high-frequency transformer may include first and second secondary windings in which first and second boosted high-frequency voltages resulting from boosting a high-frequency voltage from a high-frequency inverter are developed, respectively. The boosted high-frequency voltage induced in the first secondary winding is rectified and smoothed by a DC power supply output-side rectifying and smoothing circuit. The auxiliary voltage supply includes an auxiliary voltage supply output-side rectifying and smoothing circuit which rectifies and smoothes the boosted high-frequency voltage induced in the second secondary winding of the DC power supply high-frequency transformer.

DESCRIPTION OF EMBODIMENTS

Figure 1:
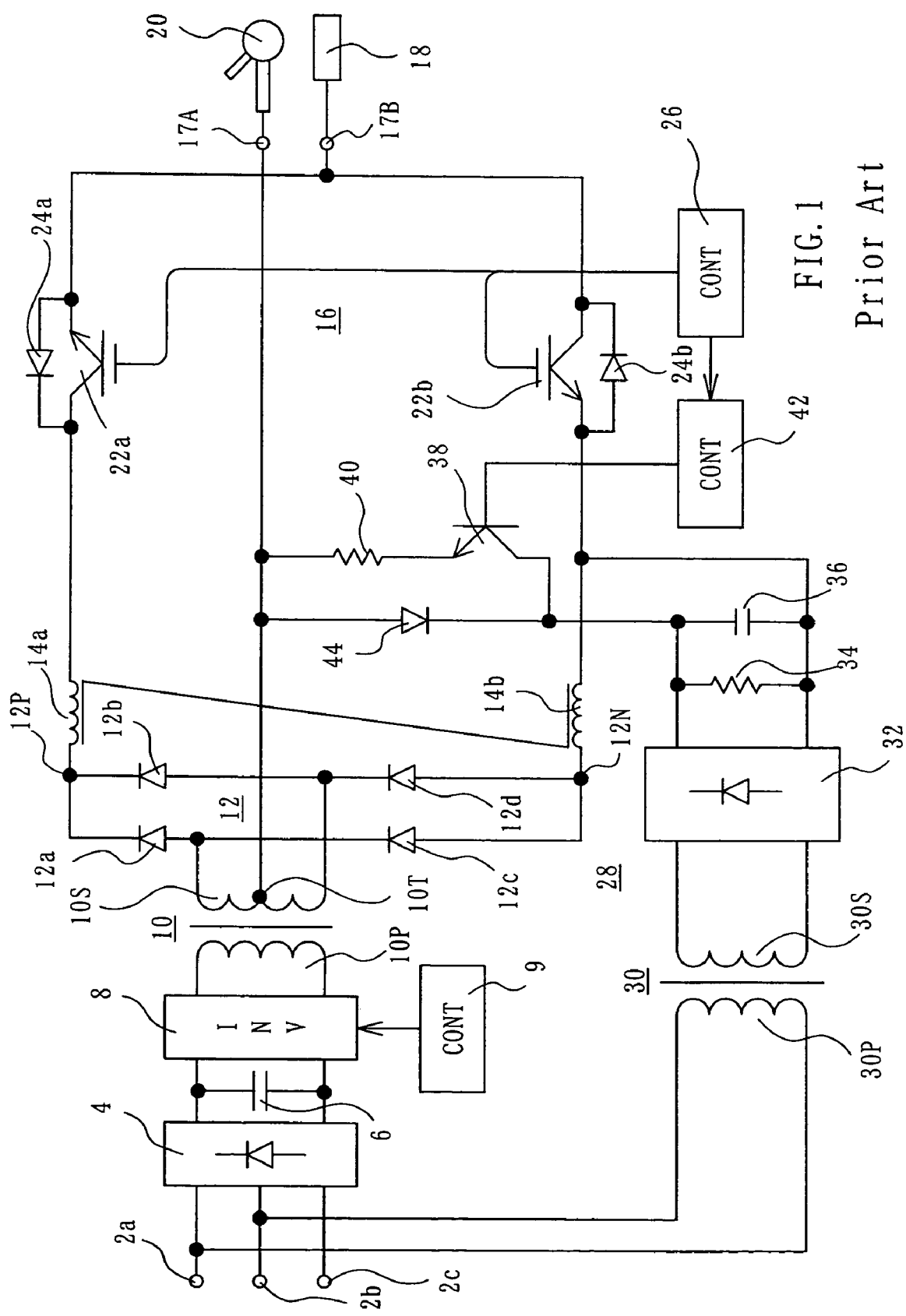
FIG. 1 is a circuit diagram of a prior art arc welder power supply apparatus.
Figure 3:
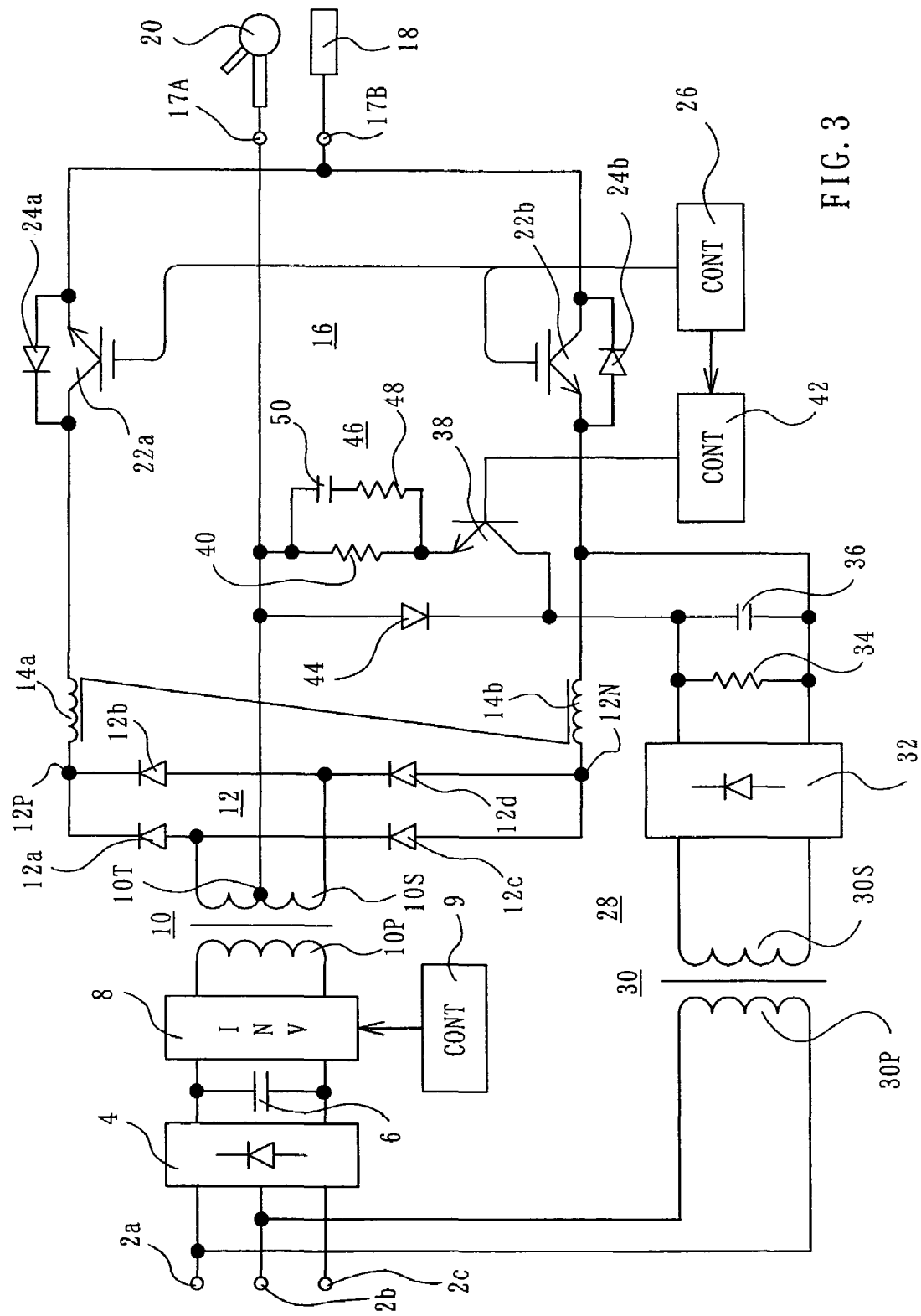
FIG. 3 is a circuit diagram of a power supply apparatus according to a first embodiment of the present invention.

A power supply apparatus according to a first embodiment of the present invention shown in FIG. 3 includes a differentiating circuit 46 connected in parallel with the current-limiting resistor 40 of the circuit shown in FIG. 1. The remainder of the power supply apparatus of FIG. 3 has the same configuration as the power supply circuit of FIG. 1, and the same reference numerals as used in FIG. 1 are used for the same or equivalent components and functions, and are given no further description about them. Throughout the drawings, the same reference numerals and symbols as used in FIG. 1 denote the same or equivalent components and functions as those of the components and functions shown in FIG. 1.

The differentiating circuit 46 is formed of a series combination of a resistor 48 and a capacitor 50. The resistor 48 has a smaller resistance value than the current-limiting resistor 40. The capacitor 50 has such a capacitance value that its charging can be completed in a time shorter than the period during which the transistor 38 is conducting.

Figure 2A:
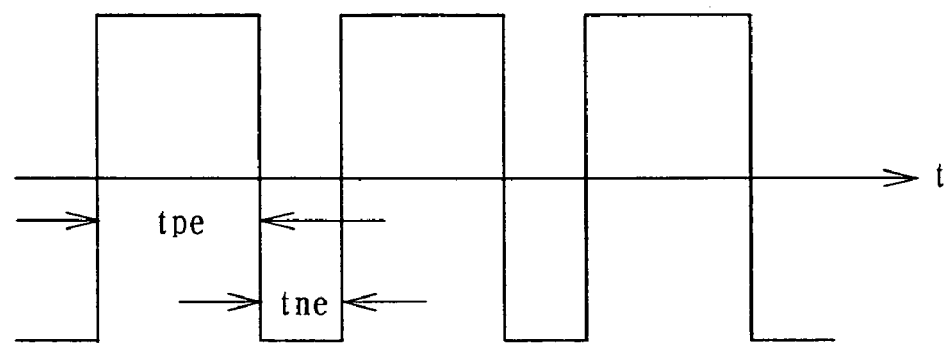
FIGS. 2A and 2B show voltage waveforms appearing at points in the power supply apparatus of FIG. 1.
Figure 2B:
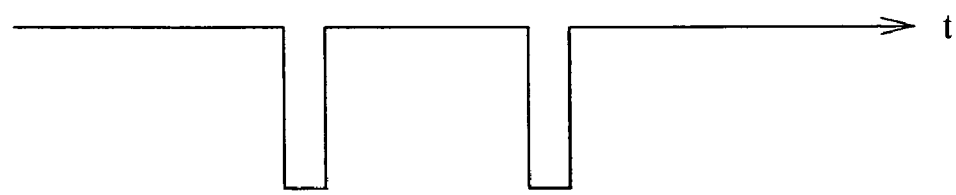
Figure 4A:
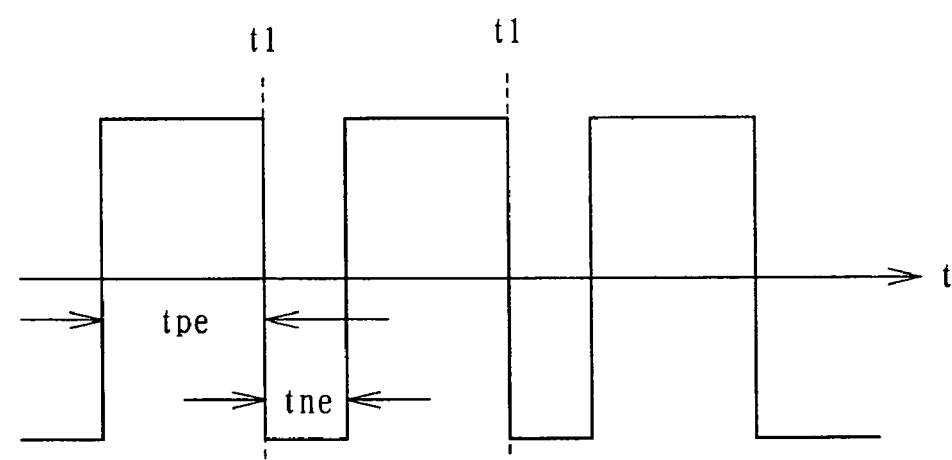
FIGS. 4A and 4B show voltage waveforms at points in the power supply apparatus of FIG. 3.
Figure 4B:
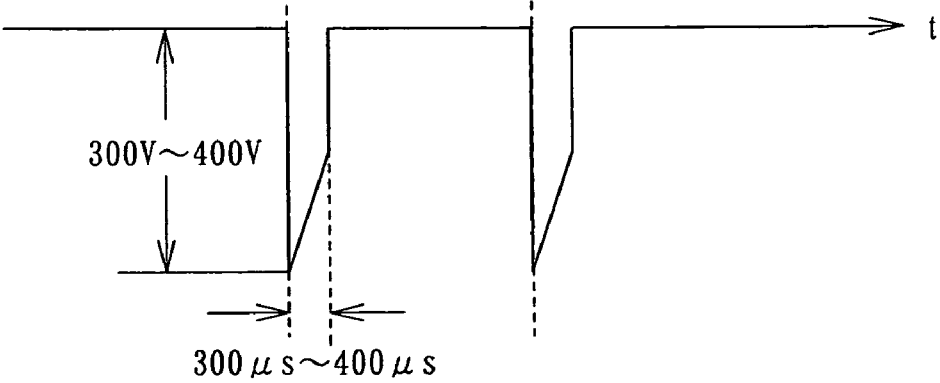

With the arrangement shown in FIG. 3, the voltage applied between the workpiece 18 and the torch 20 changes from positive to negative at each instant t1, as shown in FIG. 4A, and, then, the transistor 38 is rendered conductive. This causes the charge on the capacitor 36 to be supplied to the workpiece 18 and the torch 20 through the transistor 38, the resistor 48, the capacitor 50 and the IGBT 22b. Since the resistor 48 has a smaller resistance value than the current-limiting resistor 40, the current flows substantially through the resistor 48 and the capacitor 50, and, therefore, the voltage applied at that time between the workpiece 18 and the torch 20 is higher than the voltage which would be applied through the current-limiting resistor 40 in the circuit with the differentiating circuit 46 removed. Accordingly, if the voltage applied to the power supply input terminals 2a–2c decreases due to voltage variations in the commercial AC power supply, a relatively high voltage can be applied between the workpiece 18 and the torch 20, which ensures the re-generation of an arc when the welding current changes from positive to negative. The charging of the capacitor 50 is completed in a shorter time than the conduction period of the transistor 38, and, thereafter, the welding current does not substantially flow through the differentiating circuit 46, but flow through the current-limiting resistor 40. FIG. 4B illustrates the waveform of the voltage applied between the workpiece 18 and the torch 20 by the power supply apparatus shown in FIG. 3. This voltage has a peak value of from about 300 V to about 400 V, and a duration of from about 300 μs to about 400 μs. As will be seen from the comparison of the waveform of FIG. 4B with the one shown in FIG. 2B, the power supply apparatus of FIG. 3 can provide a higher voltage between the workpiece 18 and the torch 20. Thus, the power supply apparatus of the present invention can reliably re-generate an arc when the welding current changes from the positive polarity to the negative polarity.

Figure 5:
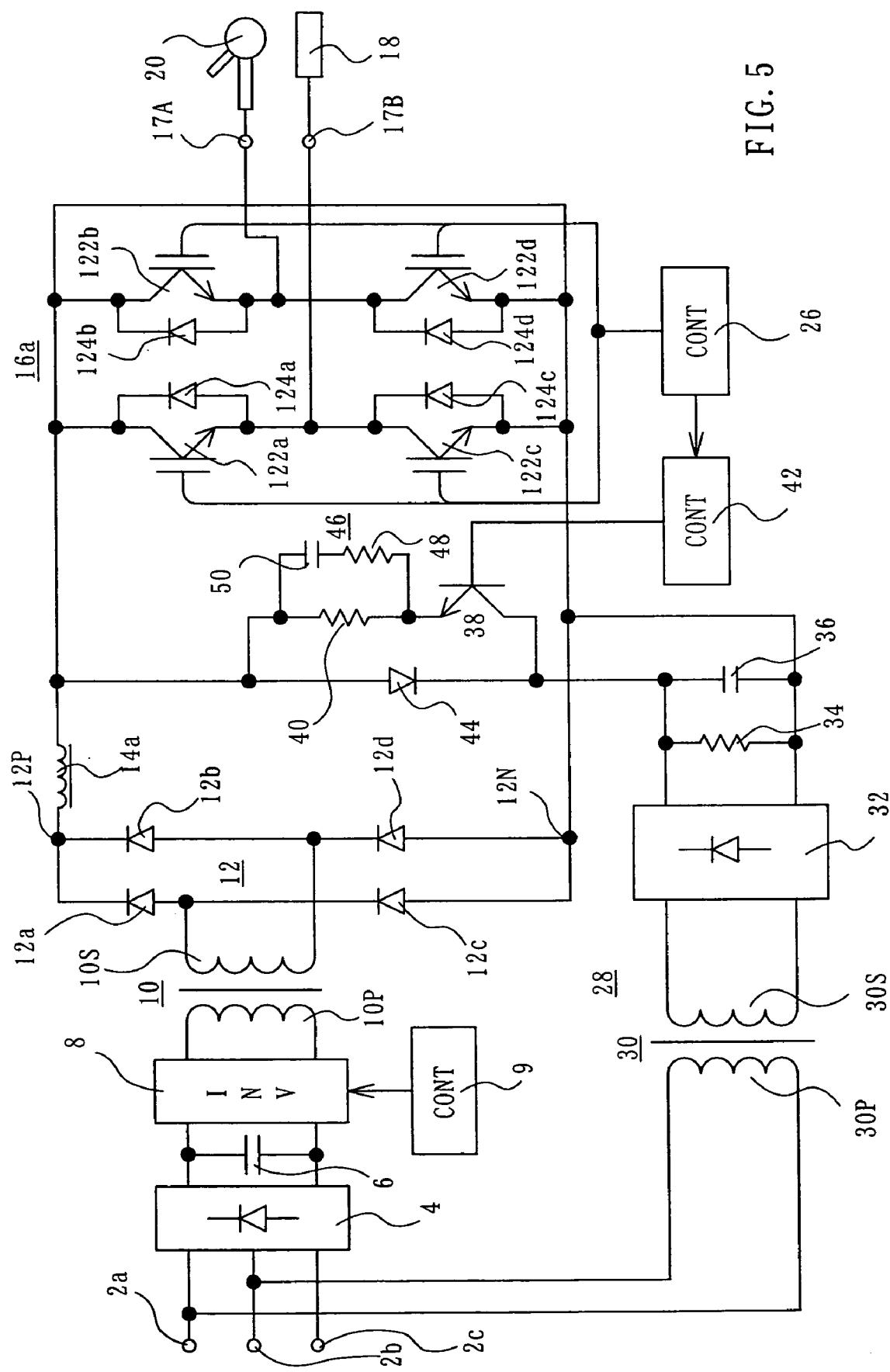
FIG. 5 is a circuit diagram of a power supply apparatus according to a second embodiment of the present invention.

FIG. 5 shows a power supply apparatus according to a second embodiment of the present invention, in which an inverter 16a having a full-bridge configuration is used as the DC-to-AC converter 16 of the power supply apparatus shown in FIG. 3.

The DC-to-AC converter 16a includes semiconductor switching devices, e.g. IGBTs 122a, 122b, 122c and 122d. The collector-emitter conduction paths of the IGBTs 122a and 122c are connected in series, and the collector-emitter conduction paths of the IGBTs 122b and 122d are connected in series. The two series combinations are connected in parallel. The output voltage of the output-side rectifying circuit 12 is applied across the parallel combination through the reactor 14a. The junction between the IGBTs 122b and 122d is connected to the torch 20, and the junction between the IGBTs 122a and 12c is connected to the workpiece 18. Flywheel diodes 124a, 124b, 124c and 124d are connected in an anti-parallel relation with the respective collector-emitter conduction paths of the IGBTs 122a–122d.

When the IGBTs 122a and 122d are conductive, a voltage is applied between the workpiece 18 and the torch 20, with the workpiece 18 being positive and with the torch 20 being negative. When the IGBTs 122b and 122c are conductive, a voltage is applied between the workpiece 18 and the torch 20 in such a sense to place the workpiece 18 negative with the torch 20 being positive. In this way, the alternating conduction of the pair of the IGBTs 122a and 122d and the pair of the IGBTs 122b and 122c causes an AC voltage to be applied between the workpiece 18 and the torch 20.

The DC voltage across the capacitor 36 is applied across the parallel combinations of the IGBTs through transistor 38, the current-limiting resistor 40 and the differentiating circuit 46. The transistor 38 is rendered conductive when the IGBTs 122b and 122c are conductive.

Figure 6:
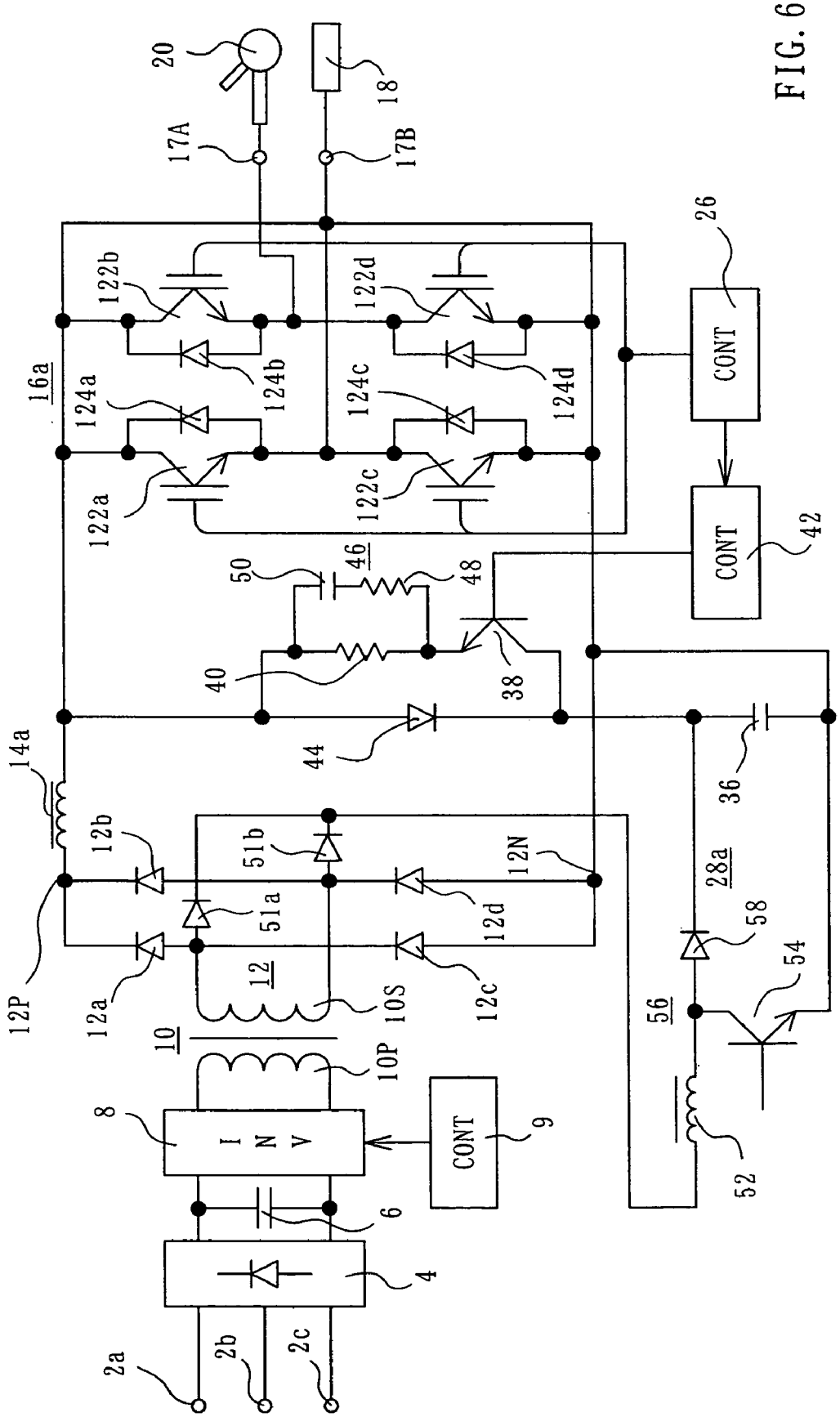
FIG. 6 is a circuit diagram of a power supply apparatus according to a third embodiment of the present invention.

FIG. 6 shows a power supply apparatus according to a third embodiment. The power supply apparatus shown in FIG. 6 uses, in place of the superposition voltage supply 28 using the voltage-boosting transformer 30 of the power supply apparatus according to the second embodiment shown in FIG. 5, an auxiliary voltage supply 28a, e.g. a voltage-booster 56, including a reactor 52 and a switching device, e.g. a bipolar transistor 54. One end of the reactor 52 is connected through the reactor 14a to the output terminal 12P of the output-side rectifier 12. The collector of the transistor 54 is connected to other end of the reactor 52 and is further connected through a reverse-blocking diode 58 to the junction between the smoothing capacitor 36 and the collector of the transistor 38. The emitter of the transistor 54 and the other end of the smoothing capacitor 36 are connected together to the negative output terminal 12N of the output-side rectifying circuit 12. A drive signal is applied from a driver circuit (not shown) to the base of the transistor 54 at given time intervals. While the drive signal is on its base, the transistor 54 is conductive. The remainder of the power supply apparatus is the same as the one shown in FIG. 3.

While the transistor 54 of the voltage-booster 56 is being conductive, current flows through the reactor 52 and the transistor 54, resulting in storage of energy in the rector 52. During the non-conduction period of the transistor 54, the voltage induced in the reactor 52 is superposed on the voltage between the output terminals 12P and 12N, whereby the voltage between the output terminals 12P and 12N is boosted.

Figure 7:
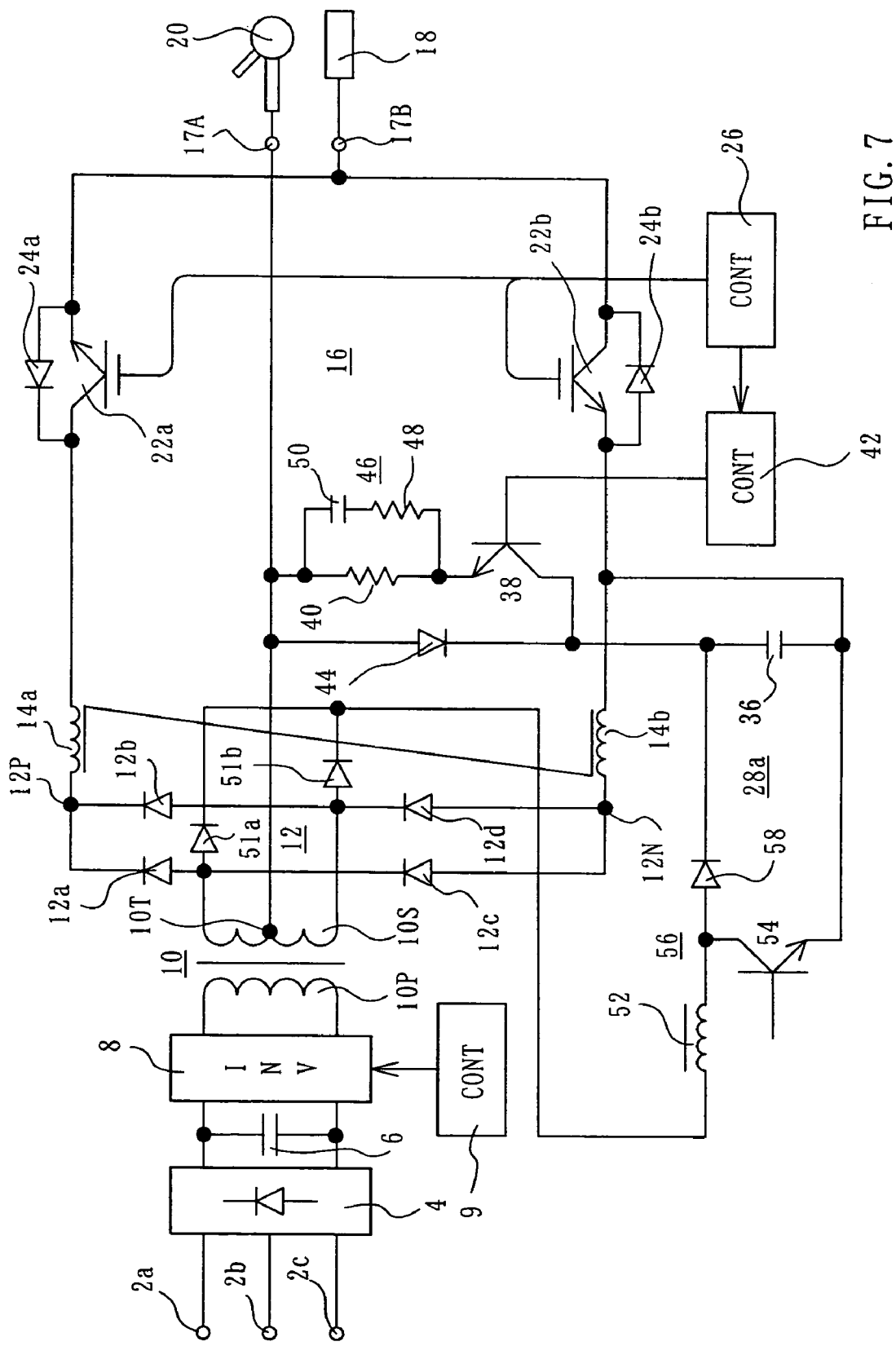
FIG. 7 is a circuit diagram of a power supply apparatus according to a fourth embodiment of the present invention.

FIG. 7 shows a power supply apparatus according to a fourth embodiment of the present invention, which has the same circuit configuration as the power supply apparatus according to the first embodiment shown in FIG. 3, except that it uses the auxiliary voltage supply 28a, i.e. the voltage-booster 56, as used in the power supply apparatus shown in FIG. 6, in place of the superposition voltage supply 28. The remainder of the circuit is the same as the power supply apparatus shown in FIG. 3.

Figure 8:
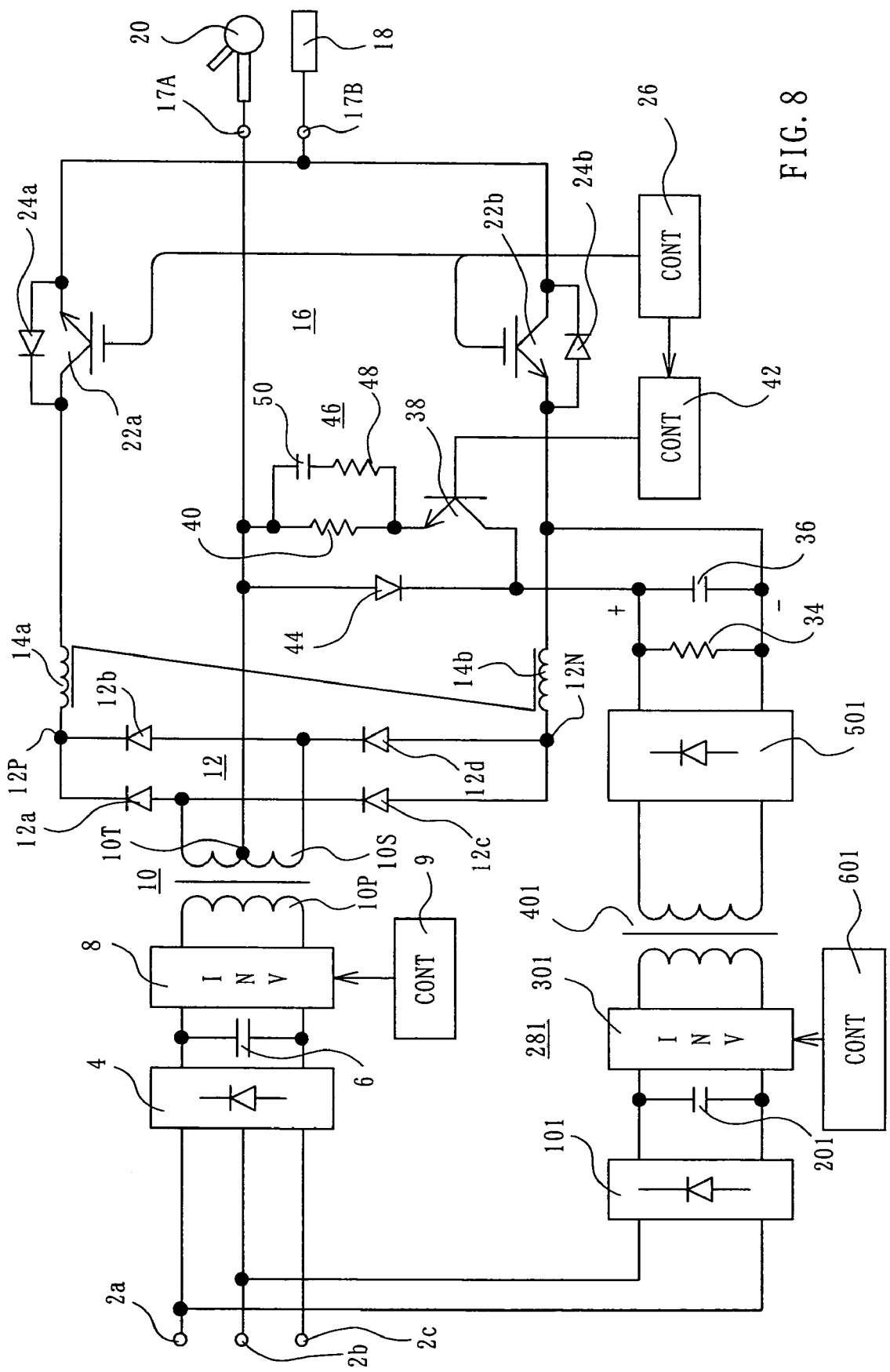
FIG. 8 is a circuit diagram of a power supply apparatus according to a fifth embodiment of the present invention.

FIG. 8 shows a power supply apparatus according to a fifth embodiment of the invention, which has the same circuit configuration as the power supply apparatus shown in FIG. 3, except that an auxiliary voltage supply 281 is used in place of the superposition voltage supply 28 of FIG. 3. The arrangement and operation of only the auxiliary voltage supply 281 are described hereinafter, and the remainder is not described.

The AC voltage applied between the AC power supply input terminals 2a and 2b is rectified in an input-side rectifying circuit 101 and smoothed by a smoothing capacitor 201 of the auxiliary voltage supply 281. The resultant DC voltage is converted to a high-frequency voltage by a high-voltage inverter 301, which is formed of a plurality of semiconductor switching devices, e.g. IGBTs, bipolar transistors or FETs, like the high-frequency inverter 8. The conduction periods of the semiconductor switching devices are controlled by a control signal supplied by an inverter control circuit 601. The output high-frequency voltage from the high-frequency inverter 301 is boosted by a high-frequency transformer 401, and the boosted high-frequency voltage is rectified in an output-side rectifying circuit 501. The resultant voltage is then smoothed by the resistor 34 and the capacitor 36.

The DC voltage developed between a plus (+) output terminal and a minus (−) output terminal of the auxiliary voltage supply 281 is applied as a superposition voltage between the workpiece 18 and the torch 20, as in the power supply apparatus of the first embodiment shown in FIG. 3. By virtue of the high-frequency transformer 401 used as the voltage-boosting transformer of the auxiliary voltage supply 281, the power supply apparatus has a high efficiency and can be small and light.

Figure 9:
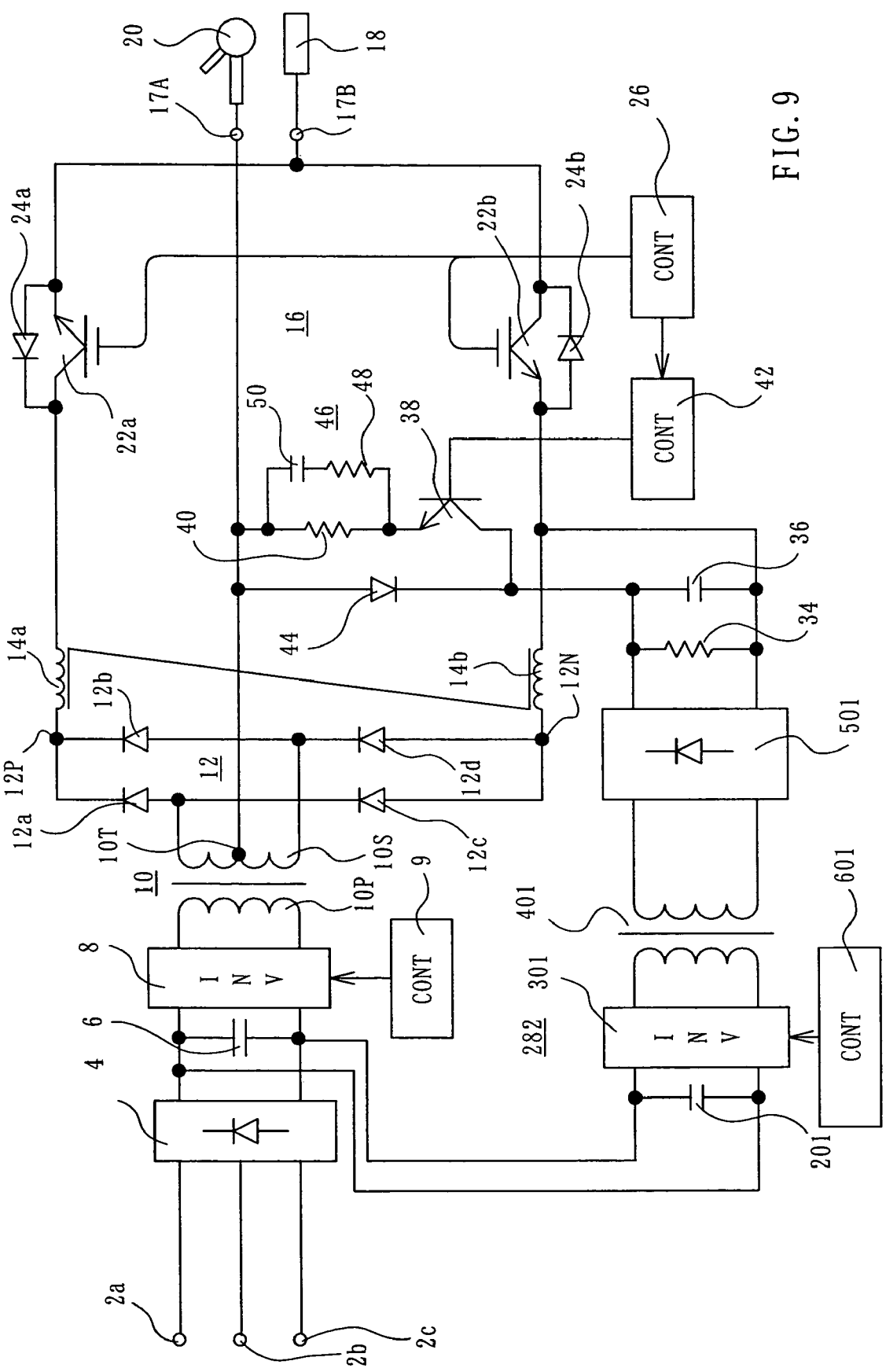
FIG. 9 is a circuit diagram of a power supply apparatus according to a sixth embodiment of the present invention.

An auxiliary voltage supply 282 of a power supply apparatus according to a sixth embodiment of the invention shown in FIG. 9 has the same circuit configuration as the auxiliary voltage supply 281 of FIG. 8, except that the input-side rectifying circuit 101 of the auxiliary voltage supply 281 is removed and that the output voltage of the input-side rectifying circuit 4 is applied to the high-frequency inverter 301. Depending on the capacitance value of the smoothing capacitor 6, the smoothing capacitor 201 may be also eliminated. By virtue of the use of the high-frequency transformer 401, the power supply apparatus according to the sixth embodiment has a high efficiency and can be small and light, as the power supply apparatus according to the fifth embodiment.

Figure 10:
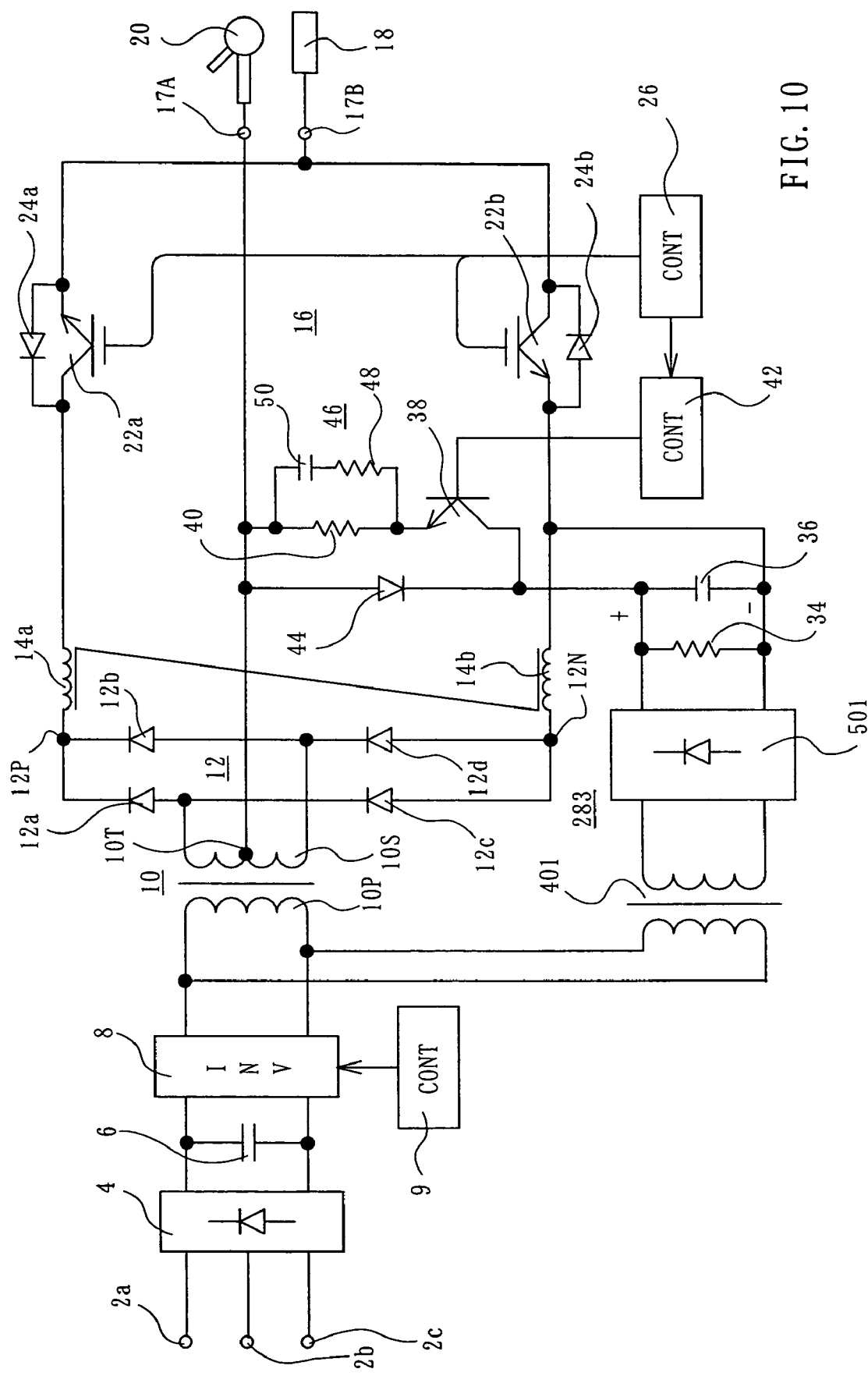
FIG. 10 is a circuit diagram of a power supply apparatus according to a seventh embodiment of the present invention.

A power supply apparatus according to a seventh embodiment of the present invention shown in FIG. 10 includes an auxiliary voltage supply 283, which is similar to the auxiliary voltage supply 281 of the power supply apparatus according to the fifth embodiment shown in FIG. 8. The auxiliary voltage supply 283 is different from the auxiliary voltage supply 281 in that it does not include the input-side rectifier circuit 101, the smoothing capacitor 201 or the high-frequency inverter 301 of the auxiliary voltage supply 281, and that the primary winding of the voltage boosting high-frequency transformer 401 is connected to the output of the high-frequency inverter 8 of the main power supply. The power supply apparatus of this seventh embodiment has a high operating efficiency and is small and light, as the power supply apparatuses according the fifth and sixth embodiments, because of the use of the high-frequency transformer 401.

Figure 11:
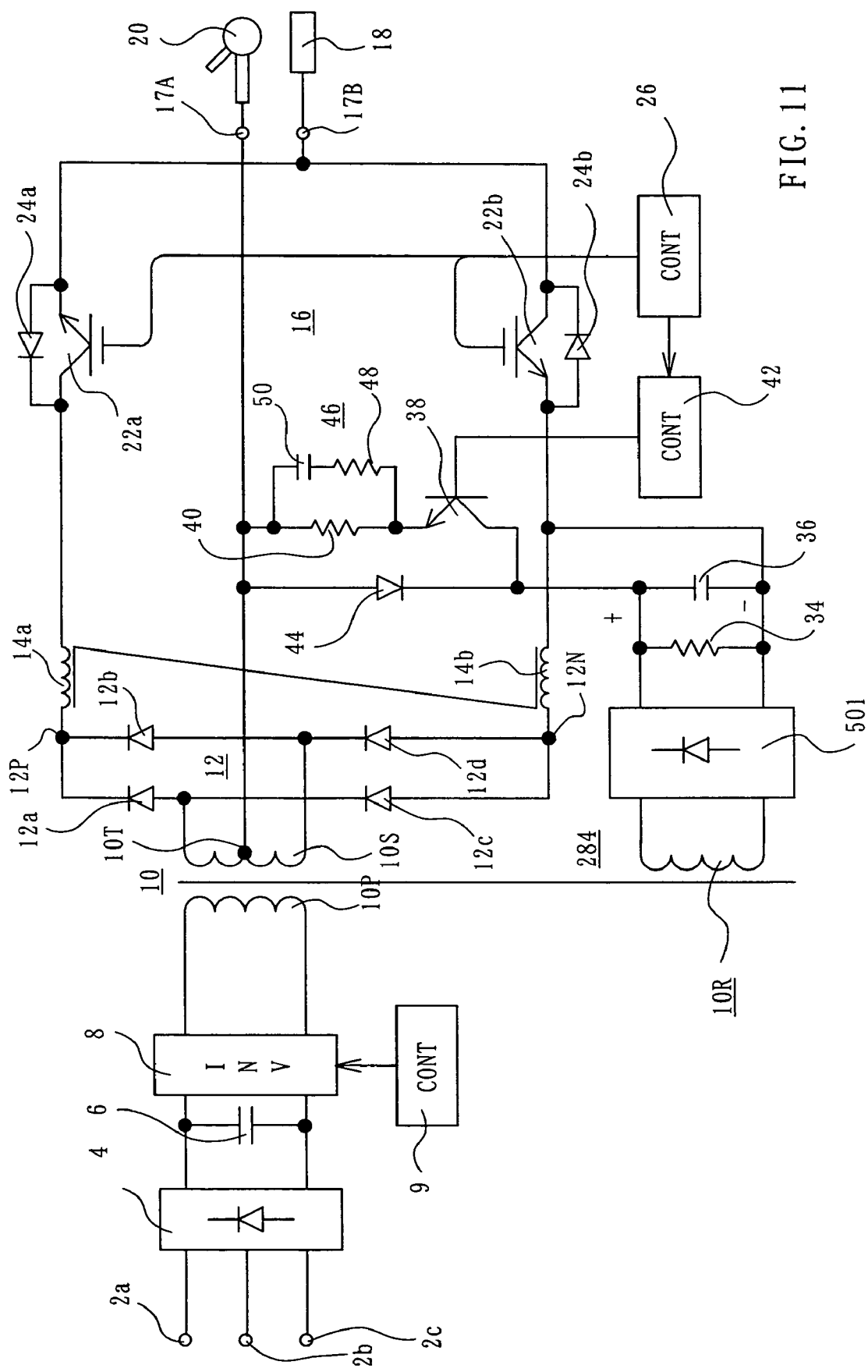
FIG. 11 is a circuit diagram of a power supply apparatus according to a eighth embodiment of the present invention.

FIG. 11 shows a power supply apparatus according to an eighth embodiment of the present invention, which uses an auxiliary voltage supply 284. The auxiliary voltage supply 284 is similar to the auxiliary voltage supply 281 shown in FIG. 8, but it differs from the auxiliary voltage supply 281 in that it does not include the input-side rectifier circuit 101, the smoothing capacitor 201, the high-frequency inverter 301, or the voltage boosting high-frequency transformer 401. Instead, a second secondary winding 10R is provided for the high-frequency transformer 10, in addition to the first primary winding 10S. The high-frequency voltage induced in the first secondary winding 10S is rectified in the output-side rectifying circuit 12, while the high-frequency voltage induced in the second secondary winding 10R is rectified in an output-side rectifying circuit 501 of the auxiliary voltage supply 284, and, then, is smoothed by the resistor 34 and the capacitor 36, which results in a superposition DC voltage to be superposed. Like the power supply apparatuses according to the fifth, sixth and seventh embodiment, the power supply apparatus according to the eighth embodiment operates efficiently and is small in size and light in weight because of the use of the high-frequency transformer 10 also as the voltage-boosting transformer of the auxiliary voltage supply 284.

Figure 12:
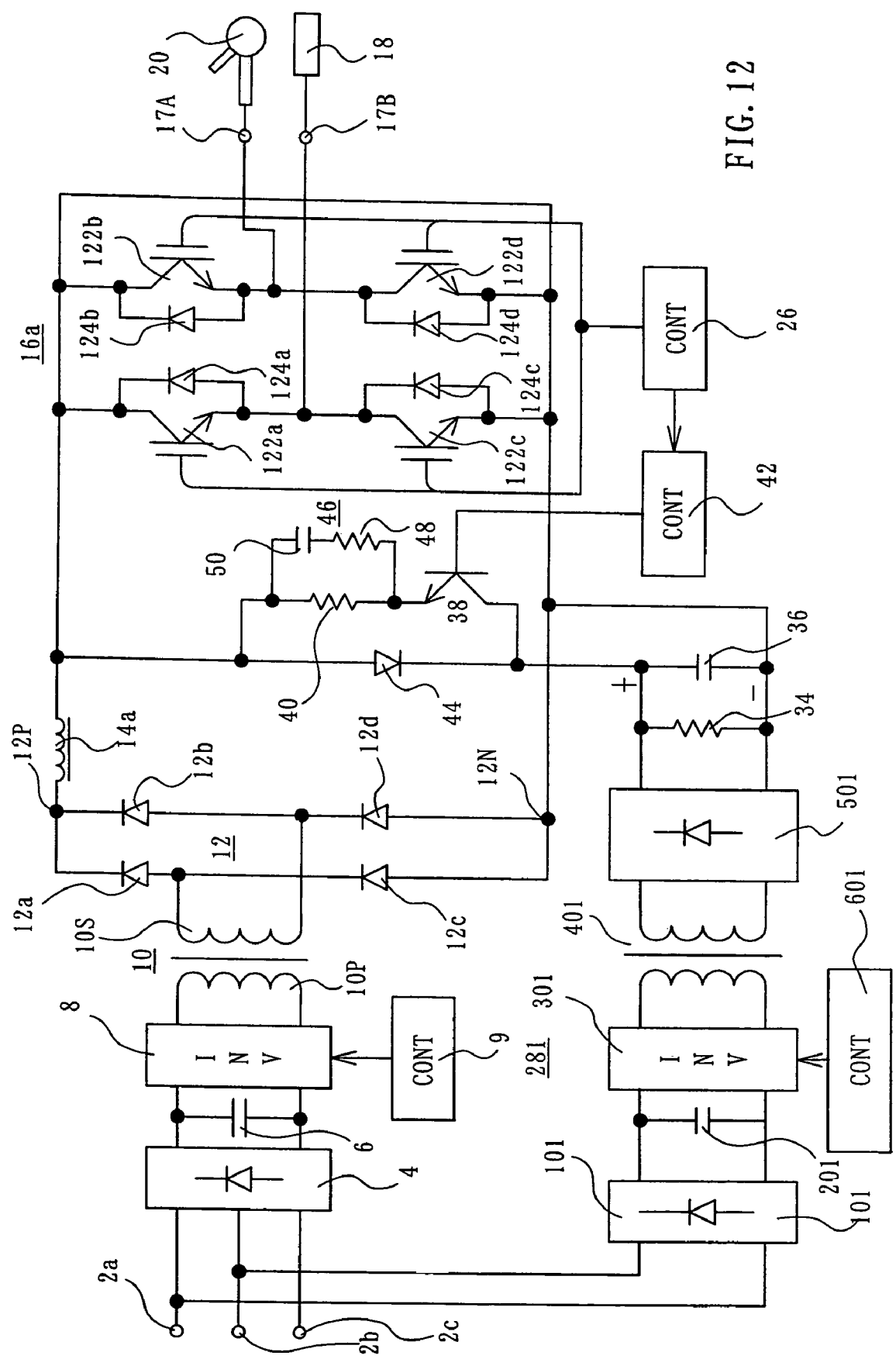
FIG. 12 is a circuit diagram of a power supply apparatus according to a ninth embodiment of the present invention.

A power supply apparatus according to a ninth embodiment of the invention is shown in FIG. 12, which uses the same auxiliary voltage supply 281 as used in the power supply apparatus according to the fifth embodiment, shown in FIG. 8.

The power supply apparatus according to this embodiment also employs the DC-to-AC converter 16a as used in the second embodiment shown in FIG. 5. As described previously with respect to the power supply apparatus shown in FIG. 5, when both the IGBTs 122a and 122d are conductive, a voltage is applied between the workpiece 18 and the torch 20, with the workpiece 18 being positive and with the torch 20 being negative. When both the IGBTs 122b and 122c are conductive, a voltage is applied between the workpiece 18 and the torch 20, with the workpiece 18 being negative and with the torch 20 being positive. Like this, alternate conduction of the pair of the IGBTs 122a and 122d and the pair of the IGBTs 122b and 122c causes an AC voltage having a waveform shown in FIG. 4A is applied between the workpiece 18 and the torch 20.

At the time t1 (FIG. 4B), at which the bipolar transistor 38 is rendered conductive, in each period Tne (FIG. 4A), during which a pair of IGBTs 122b and 122c are conductive, resulting in a negative voltage applied to the workpiece 18 with a positive voltage applied to the torch 20, a DC superposition voltage developed by the auxiliary voltage supply 281 is applied between the workpiece 18 and the torch 20. The superposition voltage exhibits a peak value of, for example, 300 V to 400 V, which is higher than the negative peak value of the voltage applied from the DC-to-AC converter 16a, and rapidly decreases from the peak value. Thus, an arc can be re-generated without fail. Because of the use of the auxiliary voltage supply 281, the power supply apparatus operates efficiently and can be small and light, as the power supply apparatus according to the fifth embodiment.

Figure 13:
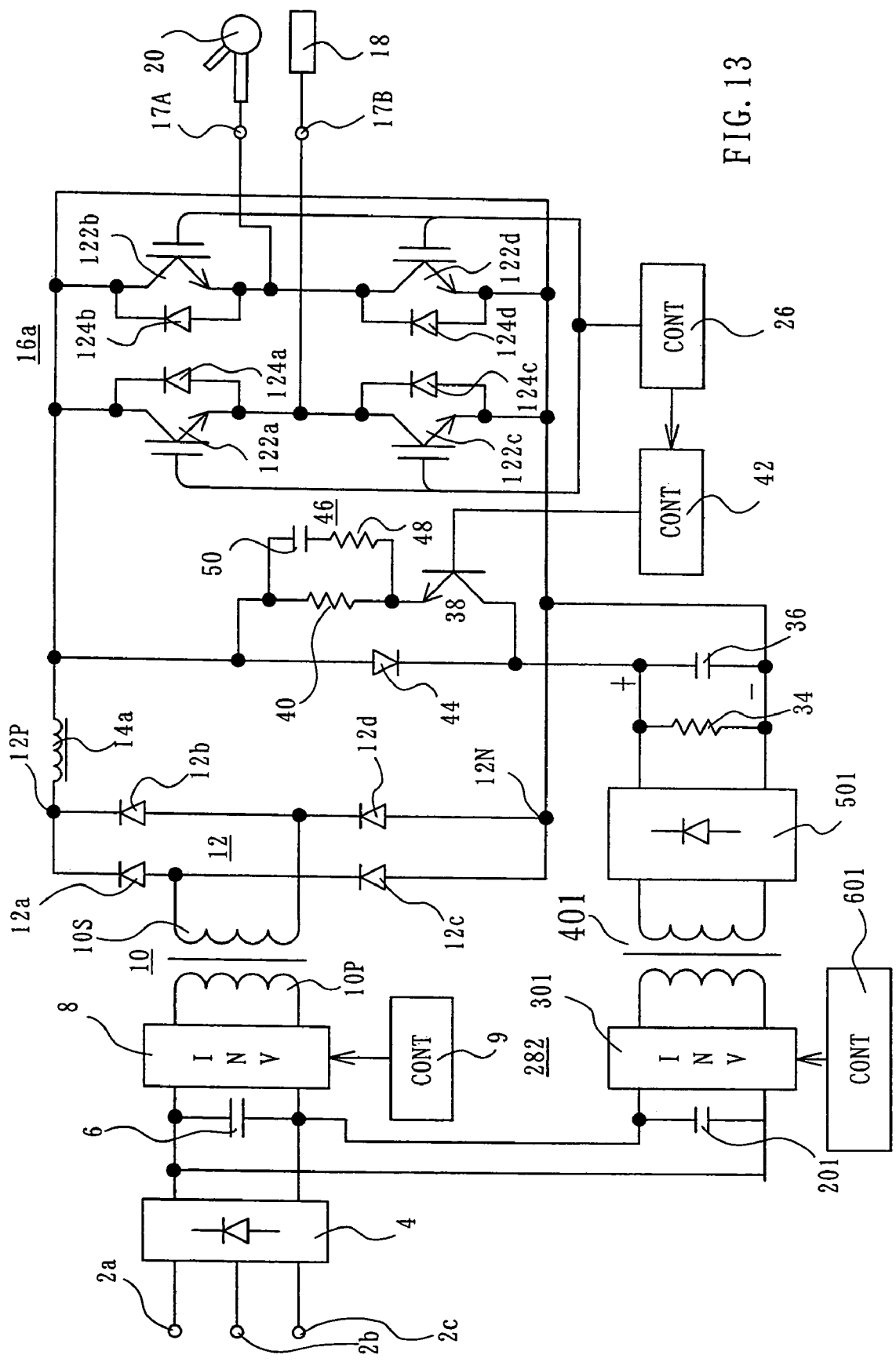
FIG. 13 is a circuit diagram of a power supply apparatus according to a tenth embodiment of the present invention.

FIG. 13 shows a power supply apparatus according to a tenth embodiment. The power supply apparatus includes the same auxiliary voltage supply 282 as used in the power supply apparatus according to the sixth embodiment shown in FIG. 9, and also the same DC-to-AC converter 16a as used in the second and ninth embodiments shown in FIGS. 5 and 12.

Figure 14:
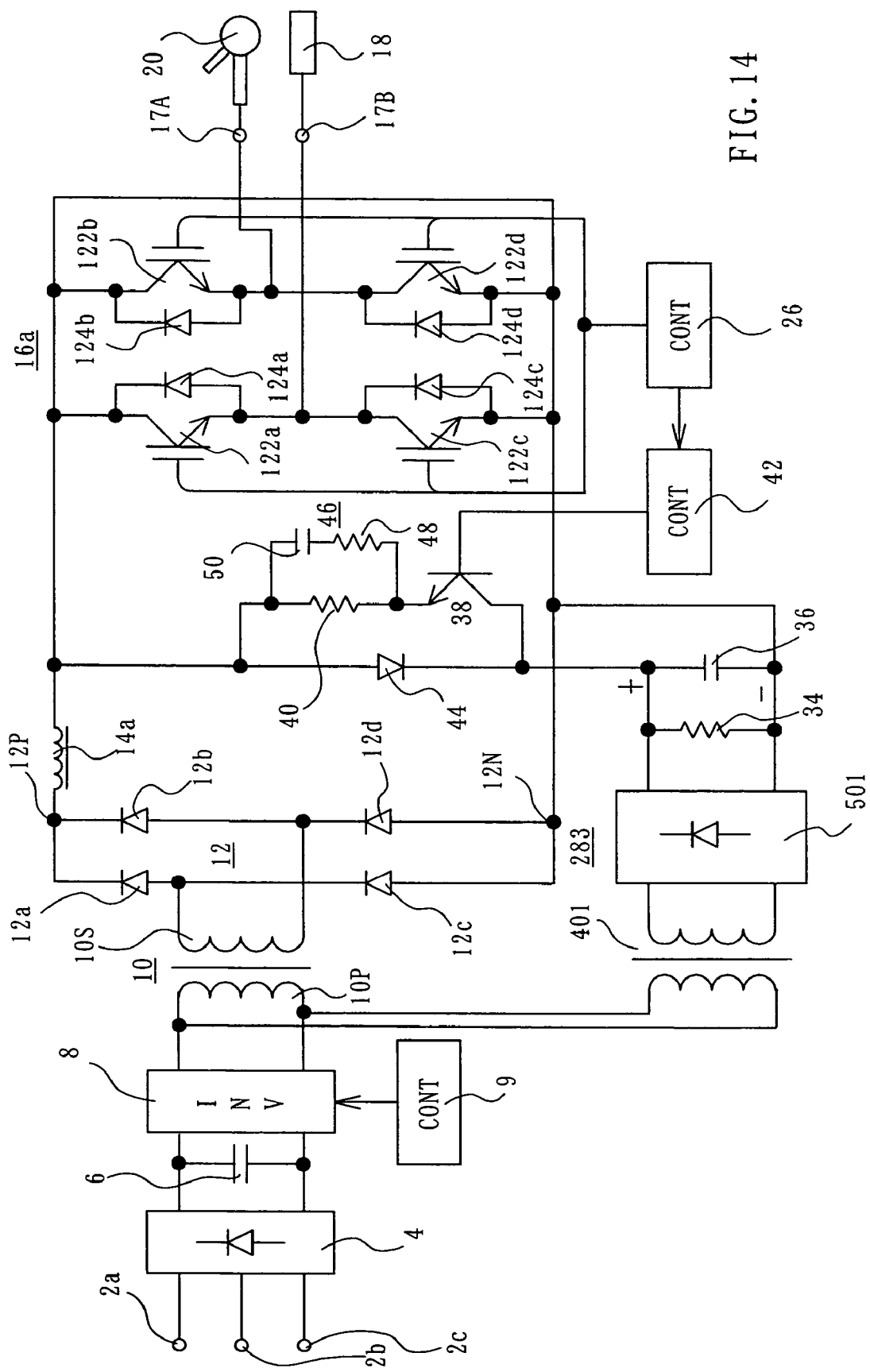
FIG. 14 is a circuit diagram of a power supply apparatus according to an eleventh embodiment of the present invention.

FIG. 14 shows another power supply apparatus according to an eleventh embodiment, which includes the same auxiliary voltage supply 283 as used in the power supply apparatus of the seventh embodiment shown in FIG. 10, and the same DC-to-AC converter 16a as used in the power supply apparatus according to the ninth embodiment shown in FIG. 12.

Figure 15:
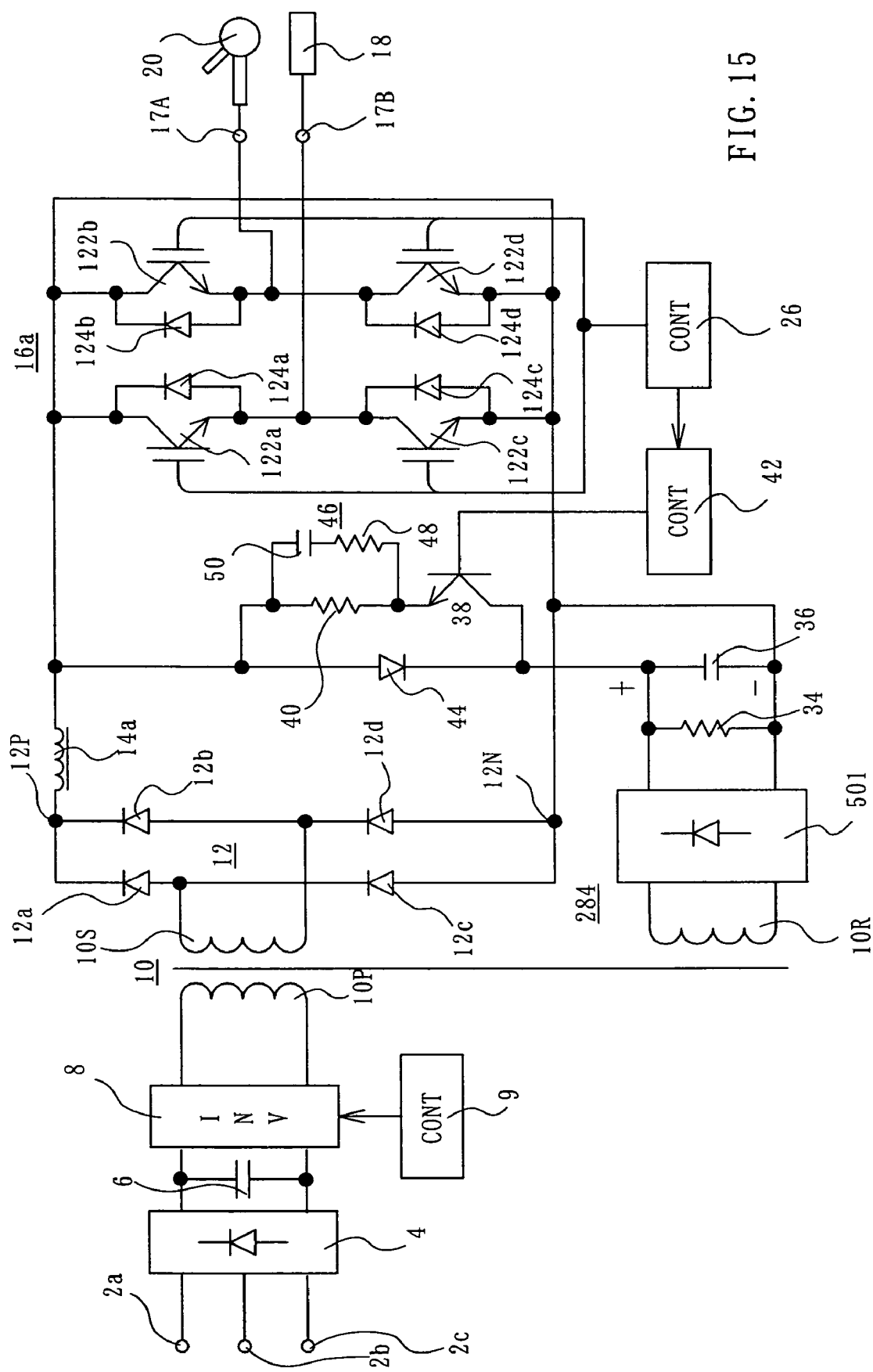
FIG. 15 is a circuit diagram of a power supply apparatus according to a twelfth embodiment of the present invention.

A power supply apparatus according to a twelfth embodiment of the invention shown in FIG. 15 uses the same auxiliary voltage supply 284 as used in the power supply apparatus according to the eighth embodiment shown in FIG. 11, together with the auxiliary voltage supply 16a as used in the power supply apparatus according to the ninth embodiment shown in FIG. 12.

The power supply apparatuses according to the tenth through twelfth embodiments employ a high-frequency transformer as their boosting transformer in the auxiliary voltage supply, and, therefore, operate efficiently and are small in size and light in weight.

The present invention has been described in terms of an arc welder power supply apparatus, but it can be embodied in a power supply apparatus for a plasma arc welder, an arc cutter, a plasma arc cutter, a charger, an electroplating apparatus, and the like, for the same effects.

In the described embodiments, the voltage from the capacitor 36 is applied between the workpiece 18 and the torch 20 through the DC-to-AC converter 16a or 16, but it may be directly applied between the workpiece 18 and the torch 20.

What is claimed is:

1. A power supply apparatus comprising:
a DC power supply for converting a first AC voltage from an AC power supply to a main DC voltage;
a DC-to-AC converter for converting said main DC voltage to a second AC voltage alternating between positive and negative polarities, said second AC voltage being adapted to be applied to a load via first and second output terminals of said power supply apparatus;
a superposition voltage supply for generating a negative voltage to be applied to said load via said first and second output terminals, said negative voltage being generated at a time of transition of said second AC voltage from positive to negative and lasting for a period shorter than a period during which said second AC voltage is negative, said negative voltage having a negative peak value larger than a negative peak value of said second AC voltage and changing rapidly from said negative peak value;
said superposition voltage supply comprising an auxiliary voltage supply generating a DC voltage having a negative peak value larger than said negative peak value of said second AC voltage, switching means rendered conductive for said period shorter than said period during which said second AC voltage is negative, and a current-limiting resistor connected in series with said switching means;
said superposition voltage supply causing a current to flow from said auxiliary voltage supply through said switching means, said current-limiting resistor and said first and second output terminals when said switching means is conductive; and
a differentiating circuit connected in parallel with said current-limiting resistor, said differentiating circuit including a resistor having a smaller resistance value than said current-limiting resistor.

2. The power supply apparatus according to claim 1 wherein said differentiating circuit comprises a series combination of said resistor and a capacitor, said capacitor having such a capacitance value that charging of said capacitor can be completed in a time shorter than the period during which said switching means is conductive.

3. The power supply apparatus according to claim 1 wherein said auxiliary voltage supply includes a smoothing capacitor in an output thereof.

4. The power supply apparatus according to claim 1 wherein:
  said DC power supply is an AC-to-DC converter to which said first AC voltage is applied as an input thereto and converts said first AC voltage to said main DC voltage; and
  said auxiliary voltage supply converts said first AC voltage to said DC voltage having a negative peak value larger than said negative peak value of said second AC voltage.

5. The power supply apparatus according to claim 1 wherein said auxiliary voltage supply is a voltage-booster for boosting a DC voltage supplied thereto from said DC power supply.

6. The power supply apparatus according to claim 1 wherein said auxiliary voltage supply comprises:
  an auxiliary voltage supply input-side rectifying and smoothing circuit for rectifying and smoothing said first AC voltage to produce a DC voltage;
  an auxiliary voltage supply high-frequency inverter for converting said DC voltage supplied from said auxiliary voltage supply input-side rectifying and smoothing circuit to a high-frequency voltage;
  an auxiliary voltage supply high-frequency transformer for boosting said high-frequency voltage; and
  an auxiliary voltage supply output-side rectifying and smoothing circuit for rectifying and smoothing said boosted high-frequency voltage.

7. The power supply apparatus according to claim 1 wherein:
  said DC power supply comprises:
  an input-side rectifying and smoothing circuit for rectifying and smoothing said first AC voltage to produce a DC voltage;
  a high-frequency inverter for converting said DC voltage supplied from said input-side rectifying and smoothing circuit to a high-frequency voltage;
  a high-frequency transformer for boosting said high-frequency voltage; and
  an output-side rectifying and smoothing circuit for rectifying and smoothing said boosted high-frequency voltage to produce said main DC voltage; and
  said auxiliary voltage supply comprises:
  an auxiliary voltage supply high-frequency inverter coupled to said input-side rectifying and smoothing circuit for converting said DC voltage supplied from said input-side rectifying and smoothing circuit to a high-frequency voltage;
  an auxiliary voltage supply high-frequency transformer for boosting said high-frequency voltage supplied from said auxiliary voltage supply high-frequency inverter; and
  an auxiliary voltage supply output-side rectifying and smoothing circuit for rectifying and smoothing said boosted high-frequency voltage supplied from said auxiliary voltage supply high-frequency transformer.

8. The power supply apparatus according to claim 1 wherein:
  said DC power supply comprises:
  an input-side rectifying and smoothing circuit for rectifying and smoothing said first AC voltage to produce a DC voltage;
  a high-frequency inverter for converting said DC voltage supplied from said input-side rectifying and smoothing circuit to a high-frequency voltage;
  a high-frequency transformer for boosting said high-frequency voltage; and
  an output-side rectifying and smoothing circuit for rectifying and smoothing said boosted high-frequency voltage to produce said main DC voltage; and
  said auxiliary voltage supply comprises:
  an auxiliary voltage supply high-frequency transformer coupled to said high-frequency inverter for boosting said high-frequency voltage supplied from said high-frequency inverter; and
  an auxiliary voltage supply output-side rectifying and smoothing circuit for rectifying and smoothing said boosted high-frequency voltage supplied from said auxiliary voltage supply high-frequency transformer.

9. The power supply apparatus according to claim 1 wherein:
  said DC power supply comprises:
  an input-side rectifying and smoothing circuit for rectifying and smoothing said first AC voltage to produce a DC voltage;
  a high-frequency inverter for converting said DC voltage supplied from said input-side rectifying and smoothing circuit to a high-frequency voltage;
  a high-frequency transformer having first and second secondary windings in which first and second boosted high-frequency voltages resulting from boosting said high-frequency voltage supplied from said high-frequency inverter are induced, respectively; and
  an output-side rectifying and smoothing circuit for rectifying and smoothing said boosted high-frequency voltage induced in said first secondary winding to produce said main DC voltage; and
  said auxiliary voltage supply comprises:
  an auxiliary voltage supply output-side rectifying and smoothing circuit for rectifying and smoothing said boosted high-frequency voltage induced in said second secondary winding of said high-frequency transformer.

* * * * *